United States Patent
Kleidon

(10) Patent No.: US 12,453,934 B2
(45) Date of Patent: Oct. 28, 2025

(54) FILTRATION DEVICES AND METHODS THEREOF

(71) Applicant: Ojai Energetics PBC, Ojai, CA (US)

(72) Inventor: William Kleidon, Ojai, CA (US)

(73) Assignee: OJAI ENERGETICS PBC, Ojai, CA (US)

( * ) Notice: Subject to any disclaimer, the term of this patent is extended or adjusted under 35 U.S.C. 154(b) by 373 days.

(21) Appl. No.: 17/691,854

(22) Filed: Mar. 10, 2022

(65) Prior Publication Data

US 2023/0027945 A1     Jan. 26, 2023

Related U.S. Application Data

(63) Continuation of application No. PCT/US2020/049981, filed on Sep. 9, 2020.
(Continued)

(51) Int. Cl.
| | | |
|---|---|---|
| *B01D 39/16* | (2006.01) | |
| *B01D 39/20* | (2006.01) | |
| *B01D 71/02* | (2006.01) | |

(52) U.S. Cl.
CPC ..... *B01D 39/1615* (2013.01); *B01D 39/2065* (2013.01); *B01D 71/0211* (2022.08);
(Continued)

(58) Field of Classification Search
CPC ........... B01D 39/1615; B01D 39/2065; B01D 71/0211; B01D 71/0212; B01D 2239/0442; B01D 2239/0492; B01D 69/1071; B01D 2239/0258; B01D 2239/065; B01D 2239/1208; B01D 2239/1216; B01D 39/04; B01D 39/083; B01D 39/2055;
(Continued)

(56) References Cited

U.S. PATENT DOCUMENTS

| | | | | |
|---|---|---|---|---|
| 5,690,823 A | * | 11/1997 | Reipur | B01D 39/2041 210/500.1 |
| 5,750,026 A | * | 5/1998 | Gadkaree | B01J 35/56 502/87 |

(Continued)

FOREIGN PATENT DOCUMENTS

WO    WO-2021050576 A1    3/2021

OTHER PUBLICATIONS

International search report with written opinion dated Dec. 10, 2020 for PCT/US2020/049981.

*Primary Examiner* — Waqaas Ali
(74) *Attorney, Agent, or Firm* — Greenberg Traurig, LLP

(57) ABSTRACT

The present disclosure provides devices and methods for filtering a fluid. An example device can include a first end configured to be joined to a first segment of a pipe. The first end can include a first opening for receiving the fluid. The device can also include a second end configured to be joined to a second segment of the pipe. The second end can include a second opening for transmitting the fluid. A filtering segment can be disposed between the first end and the second end. The filtering segment can include a plurality of fiber filters oriented substantially perpendicular to a direction of flow of the fluid in the pipe. A fiber filter of the plurality of fiber filters can include a mycomaterial and a carrier material configured to provide nutrients to the mycomaterial.

14 Claims, 2 Drawing Sheets

Related U.S. Application Data

(60) Provisional application No. 62/898,730, filed on Sep. 11, 2019.

(52) U.S. Cl.
CPC .. *B01D 71/0212* (2022.08); *B01D 2239/0442* (2013.01); *B01D 2239/0492* (2013.01)

(58) Field of Classification Search
CPC .... B01D 2258/06; B01D 69/02; B01D 71/10; B01D 2325/48; B01D 71/74; B01D 53/84; Y02A 50/20
See application file for complete search history.

(56) References Cited

U.S. PATENT DOCUMENTS

| | | | |
|---|---|---|---|
| 2004/0211721 A1 | 10/2004 | Stamets | |
| 2005/0092181 A1* | 5/2005 | Shih | H05B 3/12 55/490.1 |
| 2008/0264858 A1* | 10/2008 | Stamets | A01N 63/30 47/57.6 |
| 2010/0233788 A1 | 9/2010 | Rawson et al. | |
| 2013/0330833 A1 | 12/2013 | Ruiz et al. | |

* cited by examiner

FILTRATION DEVICES AND METHODS THEREOF

CROSS-REFERENCE

This application is a continuation of International Patent Application No. PCT/US20/49981, filed on Sep. 9, 2020, claims the benefit of U.S. Provisional Patent Application No. 62/898,730, filed Sep. 11, 2019, which application is entirely incorporated herein by reference.

BACKGROUND

Plant-based fibers can be strong, durable, and porous. Certain plants can also have antimicrobial properties and can facilitate phytoremediation. In some cases, plant-based fibers and other plant matter can be used in filtering applications.

Fungi can be used in filtering applications. In some cases, fungi can filter contaminants from substances through processes collectively referred to as mycoremediation. Mycoremediation can include accumulation of certain heavy metals and decomposition of organic molecules and hydrocarbons.

SUMMARY

The present disclosure provides systems, devices, and methods comprising fiber (e.g., hemp fiber) filters inoculated with a mycomaterial. For example, the fiber filter may comprise bast fiber and/or hurd fiber. A filtering device of the present disclosure may comprise fibrous filters inoculated with a mycomaterial. The filtering device can filter contaminants, e.g., large solids, heavy metals, hydrocarbons, or microbes, out of fluids such as air and water. The filtering device can be a pipe-shaped structure with a first end for receiving the contaminated fluid, a second end for transmitting a filtered fluid, and a filtering segment disposed between the first end and the second end that contains the inoculated fiber filters. The filtering device can be configured to be joined to a pipe, e.g., a water pipe, to filter a fluid transmitted by the pipe. Alternatively or in addition to, the fiber filters can be used independently from the pipe-shaped filtering device, e.g., in air ducts, as linings on oil rigs, or to filter ocean water contaminated by petroleum products.

In combination, the fiber and the mycomaterial can facilitate phytoremediation and mycoremediation, which are processes by which plants and fungi, respectively, remove contaminants from substances.

In an aspect, the present disclosure provides a system for filtering a fluid, comprising: a housing comprising a first opening and a second opening, wherein (i) the first opening is configured to receive the fluid and (ii) the second opening is configured to direct at least a portion of the fluid away from the housing; and a filtering unit disposed within the housing between the first opening and the second opening, wherein the filtering unit is configured to filter the fluid to provide the at least the portion of the fluid, and wherein the filtering unit comprises (i) a plurality of fibers and (ii) a mycomaterial.

In some embodiments, the plurality of fibers and the mycomaterial are different.

In some embodiments of any one of the subject systems, the plurality of fibers are oriented substantially perpendicular to a direction of flow of the at least the portion of the fluid through the filtering unit. In some embodiments of any one of the subject systems, the plurality of fibers are oriented substantially perpendicular to a direction of flow of the at least the portion of the fluid from the first opening and towards the second opening.

In some embodiments of any one of the subject systems, the first opening is configured to be in fluid communication with a first channel to receive the fluid from the first channel and towards the filtering unit. In some embodiments of any one of the subject systems, the second opening is configured to be in fluid communication with a second channel to direct the at least the portion of the fluid away from the filtering unit and towards the second channel.

In some embodiments of any one of the subject systems, the plurality of fibers or the mycomaterial is configured to remove one or more contaminants from the fluid to provide the at least the portion of the fluid. In some embodiments of any one of the subject systems, the plurality of fibers comprises one or more members selected from the group consisting of (i) a plurality of layers of graphene, (ii) a plurality of hemp fibers, and (iii) live or recently harvested plant matter. In some embodiments, a hemp fiber of the plurality of hemp fibers is carbonized.

In some embodiments of any one of the subject systems, the mycomaterial comprises fungus or a derivative thereof. In some embodiments, the fungus comprises yeasts, molds, or mushrooms. In some embodiments, the derivative of the fungus comprises (i) fresh or dried fungal hyphae or (ii) fungal spores.

In some embodiments of any one of the subject systems, the system further comprises a carrier configured to provide nutrients to the mycomaterial. In some embodiments, the carrier comprises a sugar or a biodegradable oil.

In some embodiments of any one of the subject systems, the fluid comprises an aqueous solution or petroleum.

In some embodiments of any one of the subject systems, the housing is coupled to a pipe configured to direct flow of the fluid.

In some embodiments of any one of the subject systems, the first opening is in fluid communication with a valve configured to direct flow of the fluid through the first opening and towards the filtering unit.

In another aspect, the present disclosure provides a method for filtering a fluid, comprising: (a) providing a system comprising (i) a housing comprising a first opening and a second opening and (ii) a filtering unit disposed within the housing between the first opening and the second opening, wherein the filtering unit comprises a plurality of fibers and a mycomaterial; (b) directing the fluid from the first opening and towards the filtering unit, to filter the fluid; and (c) upon the filtering in (b), directing at least a portion of the fluid from the filtering unit and towards the second opening.

In some embodiments, the plurality of fibers and the mycomaterial are different.

In some embodiments of any one of the subject methods, the plurality of fibers are oriented substantially perpendicular to a direction of flow of the at least the portion of the fluid through the filtering unit. In some embodiments of any one of the subject methods, the plurality of fibers are oriented substantially perpendicular to a direction of flow of the at least the portion of the fluid from the first opening and towards the second opening.

In some embodiments of any one of the subject methods, the first opening is in fluid communication with a first channel to receive the fluid from the first channel and towards the filtering unit. In some embodiments of any one of the subject methods, the second opening is in fluid communication with a second channel to direct the at least the portion of the fluid away from the filtering unit and towards the second channel.

In some embodiments of any one of the subject methods, the method further comprises, in (b), using the plurality of fibers or the mycomaterial to remove one or more contaminants from the fluid, to provide the at least the portion of the fluid. In some embodiments of any one of the subject methods, the plurality of fibers comprises one or more members selected from the group consisting of (i) a plurality of layers of graphene, (ii) a plurality of hemp fibers, (iii) live or recently harvested plant matter, and (iv) derivatives thereof. In some embodiments, a hemp fiber of the plurality of hemp fibers is carbonized.

In some embodiments of any one of the subject methods, the mycomaterial comprises fungus or a derivative thereof. In some embodiments, the fungus comprises yeasts, molds, or mushrooms. In some embodiments, the derivative of the fungus comprises (i) fresh or dried fungal hyphae or (ii) fungal spores.

In some embodiments of any one of the subject methods, the system further comprises a carrier configured to provide nutrients to the mycomaterial. In some embodiments, the carrier comprises a sugar or a biodegradable oil.

In some embodiments of any one of the subject methods, the fluid comprises an aqueous solution or petroleum.

In some embodiments of any one of the subject methods, the housing is coupled to a pipe configured to direct flow of the fluid.

In some embodiments of any one of the subject methods, the method further comprises using a valve in fluid communication with the first opening to direct flow of the fluid through the first opening and towards the filtering unit.

In a different aspect, the present disclosure provides a device for filtering a fluid. The device can comprise a first end configured to be joined to a first segment of a pipe. The first end can comprise a first opening for receiving the fluid. The device can further comprise a second end configured to be joined to a second segment of the pipe. The second end can comprise a second opening for transmitting the fluid. The device can further comprise a filtering segment disposed between the first end and the second end. The filtering segment can comprise a plurality of fiber filters oriented substantially perpendicular to a direction of flow of the fluid in the pipe. A fiber filter of the plurality of fiber filters can comprise a mycomaterial and a carrier material configured to provide nutrients to the mycomaterial.

In some embodiments, the plurality of fiber filters can be configured to remove contaminants from the fluid through mycoremediation when the fluid flows from the first end to the second end.

In some embodiments, the first end and the second end can comprise threads configured to be threaded with the first segment of the pipe and the second segment of the pipe, respectively.

In some embodiments, the first end and the second end can comprise flanges configured to be joined to the first segment of the pipe and the second segment of the pipe, respectively.

In some embodiments, the fiber filter can further comprise a plurality of layers of graphene.

In some embodiments, the fiber filter can further comprise live or recently harvested plant matter configured to remove contaminants from the fluid through phytoremediation.

In some embodiments, the fiber filter can comprise a plurality of layers of fine hemp cloth superimposed on and attached to one another to form a hemp mat.

In some embodiments, the mycomaterial can comprise fungal hyphae. The fungal hyphae can be fresh. The fungal hyphae can be dried.

In some embodiments, the mycomaterial can be or can include oyster mushrooms.

In some embodiments, the mycomaterial can comprise mushroom spores.

In some embodiments, the carrier material can be a sugar solution.

In some embodiments, the carrier material can be a biodegradable oil solution.

In some embodiments, the fluid can be water. The water can be contaminated with one or more petroleum products.

In some embodiments, the device can be deployed on an oil rig.

In some embodiments, the first segment of the pipe and the second segment of the pipe can form at least a portion of a water pipeline.

Another aspect of the present disclosure provides a method for filtering a fluid. The method can comprise providing the fluid to a first end of a filtering device. The first end can comprise a first opening for receiving the fluid. The filtering device can comprise the first end, a second end opposite the first end, and a filtering segment disposed between the first end and the second end. The method can further comprise passing the fluid through the filtering segment of the filtering device. The filtering segment can comprise a plurality of fiber filters oriented substantially perpendicular to a direction of flow of the fluid in the device. A fiber filter of the plurality of fiber filters can comprise a mycomaterial and a carrier material configured to provide nutrients to the mycomaterial. The method can further comprise receiving the fluid from a second end of the filtering device.

In some embodiments, the plurality of fiber filters can be configured to remove contaminants from the fluid through mycoremediation when the fluid flows from the first end to the second end.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
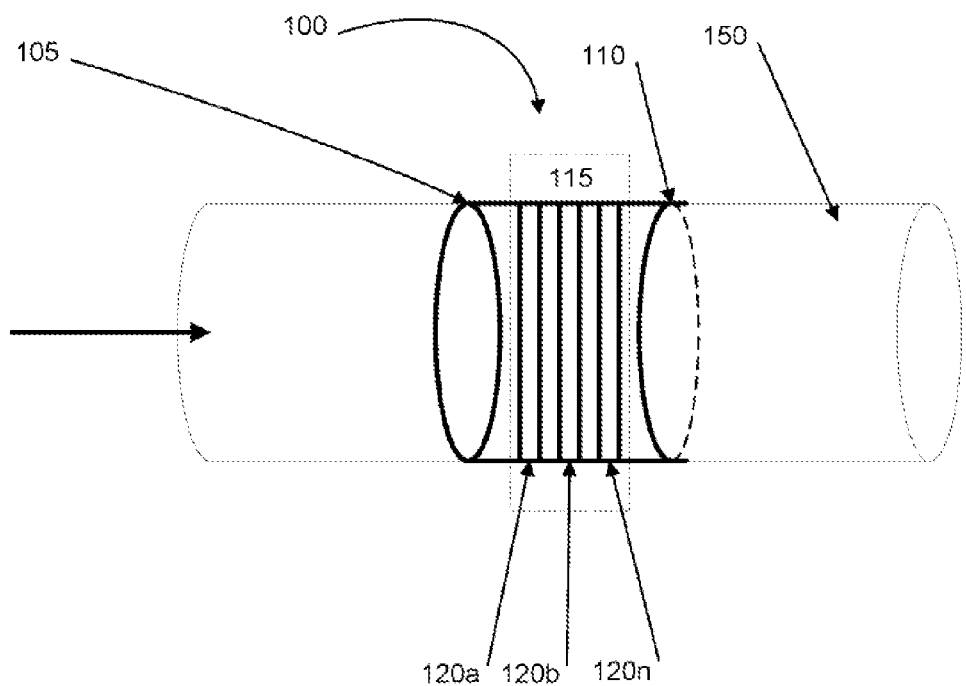
FIG. 1 illustrates a filtering device of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides systems, devices, and methods comprising a fibrous filter (e.g., hemp filter) inoculated with a mycomaterial. For example, the porous structure and strength, durability, and antimicrobial properties of certain bast fibers and/or hurd fibers, such as hemp fiber, can make it a particularly good filter material. Certain plants, including hemp, are also hyperaccumulators that can remove heavy metals from substances. The fiber filters can be inoculated with a mycomaterial, e.g., fungi, which can provide additional filtering.

The term "bast fiber," as used herein, generally refers to natural (e.g., plant) fiber and/or other material collected from the phloem (the "inner bark", sometimes called "skin") or bast surrounding the stem of certain dicotyledonous plants. Such plants may include *cannabis* plants, for example. Bast fiber may be obtained from herbs cultivated in agriculture, such as, for instance, flax, hemp, jute, sisal, kenaf, or ramie. Bast fiber may be obtained from wild plants, such as stinging nettle, and trees, such as lime, linden, *wisteria*, or mulberry. Bast fiber may be obtained from such natural material through, for example, retting or otherwise extracting from the interior xylem or epidermis (e.g., bark surface) of a plant. For example, a retting (e.g., water retting, dew retting, chemical retting, etc.) process can remove adhesive (pectinous) substances from the bast fibers to allow for their isolation. In certain instances, bast fiber may be obtained via decortication or the manual or mechanical peeling from the plant. In some instances, after extraction of bast fiber (e.g., via peeling), the stalk, stem, or core of the plant, such as hurds or shives, may be obtained.

The term "hurd fiber" or "shive fiber," as used herein, generally refers to natural (e.g., plant) fiber and/or other material collected from the stalk, stem, or core of certain dicotyledonous plants. Such plants may include cannabis plants, for example. Hurd fiber may be obtained from herbs cultivated in agriculture, such as, for instance, flax, hemp, jute, sisal, kenaf, or ramie. Hurd fiber may be obtained from wild plants, such as stinging nettle, and trees, such as lime, linden, *wisteria*, or mulberry. Hurd fiber may be obtained from such natural material through, for example, retting or otherwise extracting the bast from the interior xylem or epidermis (e.g., bark surface) of a plant, and harvesting the inner stalk, stem, or core of the plant. In certain instances, hurd fiber may be obtained via decortication or the manual or mechanical peeling of the bast from the plant. In some instances, after extraction of bast fiber (e.g., via peeling), the stalk, stem, or core of the plant, such as hurds or shives, may be obtained.

The fibers (e.g., fiber filters) of the present disclosure can comprise (e.g., can be treated to comprise or partially transform into) one or more forms of graphite-based material, e.g., graphite, expanded graphite, graphite oxide, carbon black, graphene, graphene nanosheets, graphene oxide (GO), graphene oxide nanosheets (GOn), nanostructure/nanosphere GO (nGO), chemically converted graphene (CCG), carbon nanotubes (CNT), and/or fullerenes.

FIG. 1 illustrates an example filtering device 100. The filtering device 100 can be used to filter a fluid that is transmitted through a pipe 150. The fluid may be water or a water-based liquid. The water or water-based liquid may be contaminated with heavy metals, hydrocarbons, nitrogenous compounds, pathogens, or other pollutants or toxins. The heavy metals may include arsenic, cadmium, chromium, mercury, lead, or the like. The hydrocarbons may include aromatic hydrocarbons (e.g., benzene), fossil fuels (e.g., coal, petroleum, natural gas), or fossil fuel derivatives (e.g., plastics and solvents). The nitrogenous compounds may include fertilizer or other agricultural products. And the pathogens may include bacteria and viruses.

The filtering device 100 can be made of the same material as the pipe 150, e.g., the same material as a water pipe. For example, the filtering device 100 can be made of corrosion-resistant steel, deoxidized high-phosphorus copper, or a plastic (e.g., high density cross-linked polyethylene, polyvinyl chloride, etc.). Alternatively, the filtering device 100 can be made of a different material.

The filtering device 100 can include a first end 105 configured to be joined to a first segment of the pipe 150. The first end 105 can receive the fluid to be filtered. The first end 105 can be welded, soldered, or brazed to the first segment of the pipe 150. Alternatively, the first end 105 can be mechanically joined to the first segment of the pipe 150. For example, the first end 105 can be connected to the first segment of the pipe 150 with rivets, bolts, or screws. The first end 105 can have a flange to facilitate connection using the rivets, bolts, or screws. Alternatively, the first end 105 can include threads configured to be threaded with the first segment of the pipe 150.

The filtering device 100 can include a second end 110 configured to be joined to a second segment of the pipe 150. The second end 110 can transmit the filtered fluid. The second end 110 can be welded, soldered, or brazed to the second segment of the pipe 150. Alternatively, the second end 110 can be mechanically joined to the second segment of the pipe 150. For example, the second end 110 can be connected to the second segment of the pipe 150 with rivets, bolts, or screws. The second end 110 can have a flange to facilitate connection using the rivets, bolts, or screws. Alternatively, the second end 110 can include threads configured to be threaded with the second segment of the pipe 150.

In some cases, the filtering device 100 and the pipe 150 can be a unitary piece of plastic or metal. That is, the filtering device 100 and the pipe 150 can be formed using a single mold.

The filtering device 100 can include a filtering segment 115. The filtering segment 115 can include a plurality of fiber filters 120a to 120n. The fiber filters 120a to 120n can be made of any of the plant-based fibers described in this disclosure (e.g., hemp fibers). The filtering segment 115 can include about 2, 3, 4, 5, 10, 15, 20, or more fiber filters. The fiber filters 120a to 120n can be oriented substantially perpendicular to a direction of flow of the fluid in the filtering device 100 so that the fluid is required to pass through the filters. Alternatively or in addition, the fiber filters can be oriented in any non-parallel angle with respect to a direction of flow of the fluid in the filtering device in a configuration that permits the fluid to pass through the filters. For example, a plane of a filter can be oriented at an angle of at least about 15 degrees, 30 degrees, 45 degrees, 60 degrees, 75 degrees, 80 degrees, 85 degrees or more with respect to an axis of direction of fluid flow. Alternatively or in addition, a plane of a filter can be oriented at an angle of at most about 85 degrees, 80 degrees, 75 degrees, 60 degrees, 45 degrees, 30 degrees, 15 degrees, or less with respect to an axis of direction of fluid flow.

The fiber filters 120a to 120n can be made of fine hemp cloth. The fine hemp cloth can be made by weaving hemp bast fibers together. In some cases, multiple layers of hemp cloth can be superimposed on and attached to one another to form a hemp mat.

The fiber filters 120a to 120n can have a square, rectangular, circular, elliptical, or polygonal cross-section, depending on the cross-section of the filtering device 100. In some instances, a fiber filter of the fiber filters 120a to 120n can have a maximum thickness of about 1 millimeter (mm), 2 mm, 3 mm, 4 mm, 5 mm, 10 mm, 25 mm, or 50 mm, or more. The fiber filters 120a to 120n can be affixed to the inside of the filtering device 100 with a water-resistant adhesive. Alternatively, the filtering device 100 can have a plurality of grooves configured to receive and support the fiber filters 120a to 120n. Alternatively or in addition, a fiber filter of the fiber filters 120a to 120n can have a maximum thickness on the order of at least 1 mm, 10 mm, 100 mm, 1000 mm, $10^4$ mm, $10^5$ mm, or more. Alternatively or in addition, a fiber filter of the fiber filters 120a to 120n can have a maximum thickness on the order of at most about $10^5$ mm, $10^4$ mm, 1000 mm, 100 mm, 10 mm, 1 mm, or less.

The fiber filters 120a to 120n can be configured to remove contaminants from a fluid flowing from the first end 105 to the second end 110 of the filtering device 100. The fiber filters 120a to 120n can have pores that can permit the fluid to flow through the filtering device 100. As the fluid flows through them, the fiber filters 120a to 120n can remove contaminants from the fluid. For example, the fiber filters 120a to 120n can remove large solids from the fluid. The fiber filters 120a to 120n can also remove microbes from the fluid, owing to certain fiber's (e.g., hemp's) antimicrobial properties. In some instances, the filters can have a porosity of at least about 1%, 5%, 10%, 20%, 30%, 40%, 50%, 60%, 70%, 80%, 90%, or more. The pores can have a diameter of at least about 0.01 microns, 0.1 microns, 1 micron, 2 microns, 5 microns, 10 microns, 20 microns, or more. In some cases, the fiber filters 120a to 120n can include live or recently harvested plant matter (e.g., hemp matter). Recently harvest plant matter may be plant matter that was harvested in at least about the last 1 day, 2 days, 5 days, 7 days, or 10 days, or more. The live or recently harvested plant matter can facilitate a process called phytoremediation. Phytoremediation generally refers to the use of living plants to remove contaminants from water, air, soil, or another material or substance. Phytoremediation can encompass several different mechanisms of action.

A first mechanism of action is phytoextraction (or phytoaccumulation), which is a process by which a plant can remove contaminants from a substance by concentrating the contaminants in the plant's biomass. Phytoextraction can be used to remove heavy metals or inorganic materials from a substance. For example, hemp can be a particularly good accumulator of lead.

A second mechanism of action is phytodegradation, which is a process by which a plant can degrade contaminants in the soil. Specifically, the enzymes that the plant's roots naturally secrete can break down contaminants. In other cases, microorganisms living in association with plant roots can metabolize contaminants. Phytodegradation can be particularly useful for removing organic compounds and hydrocarbons from a substance.

A third mechanism of action is rhizofiltration, which is a process by which a liquid can be filtered through the roots of a plant. The roots can remove contaminants by storing the contaminants in the root biomass or transporting the contaminants up into the stems and/or leaves.

The fiber filters 120a to 120n can include a mycomaterial and a carrier material for the mycomaterial. Mycomaterials can include fungi, e.g., yeasts, molds, mushrooms, or derivatives thereof. Fungi are nature's principle decomposers and can acquire nutrients by absorbing dissolved molecules generated by digestive enzymes secreted by the fungi. For this reason, fungi can be particularly good at breaking down organic pollutants and hydrocarbons. Many fungi are also hyperaccumulators of heavy metals. That is, they can concentrate heavy metals in their fruiting bodies through biosorption to the cellular surface, but with minimal intracellular uptake. Fungi can also have antibiotic properties. Collectively, these functions and properties can allow mycomaterials to filter fluids that pass through the fiber filters 120a to 120n. These processes may be referred to as mycoremediation.

The mycomaterial in the fiber filters 120a to 120n can be or include spores, actively growing hyphae, dried or freeze-dried powdered mycelium, or powdered fruit bodies.

The mycomaterial can be used fresh or metabolically arrested via refrigeration (e.g., for storage and transport). Alternatively, the mycomaterial can be metabolically arrested through freeze-drying (e.g., flash chilling), drying, or by other means, for storage, transportation and subsequent rehydration for deployment into the fiber filters 120a to 120n. The metabolic arrest of growth can be a slowing of metabolism or a total suspension or shutdown of metabolism (freeze-drying, air-drying and cryogenic suspension).

Suitable fungal genera for the mycomaterial can include the gilled mushrooms (Agaricales) *Agaricus, Agrocybe, Armillaria, Clitocybe, Collybia, Conocybe, Coprinus, Flammulina, Giganopanus, Gymnopilus, Hypholoma, Inocybe, Hypsizygus, Lentinula, Lentinus, Lenzites, Lepiota, Lepista, Lyophyllum, Macrocybe, Marasmius, Mycena, Omphalotus, Panaeolus, Panellus, Pholiota, Pleurotus, Pluteus, Psathyrella, Psilocybe, Schizophyllum, Sparassis, Stropharia, Termitomyces, Tricholoma, Volvariella*, etc.; the polypore mushrooms (Polyporaceae) *Albatrellus, Antrodia, Bjerkandera, Bondarzewia, Bridgeoporus, Ceriporia, Coltricia, Daedalea, Dentocorticium, Echinodontium, Fistulina, Flavodon, Fomes, Fomitopsis, Ganoderma, Gloeophyllum, Grifola, Hericium, Heterobasidion, Inonotus, Irpex, Laetiporus, Meripilus, Oligoporus, Oxyporus, Phaeolus, Phellinus, Piptoporus, Polyporus, Schizopora, Trametes, Wolfiporia*, etc.; Basidiomycetes such as *Auricularia, Calvatia, Ceriporiopsis, Coniophora, Cyathus, Lycoperdon, Merulius, Phlebia, Serpula, Sparassis* and *Stereum*; Ascomycetes such as *Cordyceps, Morchella, Tuber, Peziza*, etc.; 'jelly fungi' such as *Tremella*; the mycorrhizal mushrooms (including both gilled and polypore mushrooms) and endomycorrhizal and ectomycorrhizal non-mushroom fungi such as *Acaulospora, Alpova, Amanita, Astraeus, Athelia, Boletinellus, Boletus, Cantharellus, Cenococcum, Dentinum, Gigaspora, Glomus, Gomphidius, Hebeloma, Lactarius, Paxillus, Piloderma, Pisolithus, Rhizophagus, Rhizopogon, Rozites, Russula, Sclerocytis, Scleroderma, Scutellospora, Suillus, Tuber*, etc.; fungi such as *Phanerochaete* (including those such as *P.*

*chrysosporium* with an imperfect state and *P. sordida*); the fungi *imperfecti* and related molds and yeasts including *Actinomyces, Altemaria, Aspergillus, Botrytis, Candida, Chaetomium, Chrysosporium, Cladosporium, Cryptococcus, Dactylium, Doratomyces* (*Stysanus*), *Epicoccum, Fusarium, Geotrichum, Gliocladium, Humicola, Monilia, Mucor, Mycelia sterilia, Mycogone, Neurospora, Papulospora, Penicillium, Rhizopus, Scopulariopsis, Sepedonium, Streptomyces, Talaromyces, Torula, Trichoderma, Trichothecium, Verticillium*, etc.; and entomopathogenic fungi such as *Metarhizium, Beauveria, Paecilomyces, Verticillium, Hirsutella, Aspergillus, Akanthomyces, Desmidiospora, Hymenostilbe, Mariannaea, Nomuraea, Paraisaria, Tolypocladium, Spicaria, Botrytis, Rhizopus*, the *Entomophthoracae* and other *Phycomycetes*, and *Cordyceps*.

Suitable fungal species for the mycomaterial can include *Agaricus augustus, A. blazei, A. brunnescens, A. campestris, A. lilaceps, A. placomyces, A. subrufescens* and *A. sylvicola, Acaulospora delicata; Agrocybe aegerita* and *A. arvalis; Albatrellus hirtus* and *A. syringae; Alpova pachyploeus; Amanita muscaria; Antrodia carbonica; Armillaria bulbosa, A. gallica, A. matsutake, A. mellea* and *A. ponderosa; Astraeus hygrometricus; Athelia neuhoffii; Auricularia auricula* and *A. polytricha; Bjerkandera adusta* and *B. adusta; Boletinellus merulioides; Boletus punctipes; Bondarzewia berkeleyi; Bridgeoporus nobilissimus; Calvatia gigantea; Cenococcum geophilum; Ceriporiapurpurea; Ceriporiopsis subvermispora; Collybia albuminosa* and *C. tuberosa; Coltricia perennis; Coniophoraputeana; Coprinus comatus* and 'Inky Caps'; *Cordyceps variabilis, C. facis, C. subsessilis, C. myrmecophila, C. sphecocephala, C. entomorrhiza, C. gracilis, C. militaris, C. washingtonensis, C. melolanthae, C. ravenelii, C. unilateralis, C. clavulata* and *C. sinensis; Cyathus stercoreus; Daedalea quercina; Dentocorticium sulphurellum; Echinodontium tinctorium; Fistulina hepatica; Flammulina velutipes* and *F. populicola; Flavodonflavus; Fomes fomentarius; Fomitopsis officinalis* and *F. pinicola; Ganoderma applanatum, G. australe, G. curtisii, G. japonicum, G. lucidum, G. neo-japonicum, G. oregonense, G. sinense* and *G. tsugae; Gigaspora gigantia, G. gilmorei, G. heterogama, G. margarita; Gliocladium virens; Gloeophyllum saeparium; Glomus aggregatum, G. caledonius, G. clarus, G. fasciculatum, G. fasiculatus, G. lamellosum, G. macrocarpum* and *G. mosseae; Grifola frondosa; Hebeloma anthracophilum* and *H. crustuliniforme; Hericium abietes, H. coralloides, H. erinaceus* and *H. capnoides; Heterobasidion annosum; Hypholoma capnoides* and *H. sublateritium; Hypsizygus ulmarius* and *H. tessulatus* (*H. marmoreus*); *Inonotus hispidus* and *I. obliquus; Irpex lacteus; Lactarius deliciosus; Laetiporus sulphureus* (*Polyporus sulphureus*); *Lentinula edodes; Lentinus lepideus, L. giganteus, L. ponderosa, L. squarrosulus* and *L. tigrinus; Lentinula* species; *Lenzites betulina; Lepiota rachodes* and *L. procera; Lepista nuda* (*Clitocybe nuda*); *Lycoperdon lilacinum* and *L. perlatum; Lyophyllum decastes; Macrocybe crassa; Marasmius oreades; Meripilus giganteus; Merulius tremellosus* and *M. incamatus; Morchella angusticeps, M. crassipes* and *M. esculenta; Mycena citricolor* and *M. chlorophos; Omphalotus olearius; Panellus stypticus; Paxillus involutus; Penicillium oxalicium; Phaeolus schweinitzii; Phellinus igniarius P. linteus* and *P. weirii; Pholiota nameko; Piloderma bicolor, Piptoporus betulinus; Pisolithus tinctorius; Pleurotus citrinopileatus* (*P. comucopiae* var. *citrinopileatus*), *P. cystidiosus*, (*P. abalonus, P. smithii*), *P. djamor* (*P. flabellatus, P. salmoneo-stramineus*), *P. dryinus, P. eryngii, P. euosmus, P. ostreatus, P. pulmonarius* (*P. sajor-caju*) and *P. tuberregium; Pluteus cervinus; Polyporus indigenus, P. saporema, P. squamosus, P. tuberaster* and *P. umbellatus* (*Grifola umbellata*); *Psathyrella hydrophila, Psilocybe aztecorum, P. azurescens, P. baeocystis, P. bohemica, P. caerulescens, P. cubensis, P. cyanescens, P. hoogshagenii, P. mexicana, P. pelliculosa, P. semilanceata, P. tampanensis* and *P. weilii; Rhizopogon nigrescens, R. roseolus* and *R. tenuis* (*Glomus tenuis*); *Schizophyllum commune; Schizopora paradoxa; Sclerocytis sisuosa; Serpula lacrymans* and *S. himantioides; Scleroderma albidum, S. aurantium* and *S. polyrhizum; Scutellospora calospora; Sparassis crispa* and *S. herbstii; Stereum complicatum* and *S. ostrea; Stropharia aeruginosa, S. cyanea, S. albocyanea, S. caerulea* and *S. rugosoannulata; Suillus cothumatus; Talaromyces flavus; Termitomyces robustus; Trametes hirsuta, T. suaveolens* and *T. versicolor, Trichoderma viride, T. harmatum; Tricholoma giganteum* and *T. magnivelare* (*matsutake*); *Tremella aurantia, T. fuciformis* and *T. mesenterica; Volvariella volvacea*; and numerous other beneficial fungi.

The mycomaterial can be applied to the fiber filters 120*a* to 120*n* along with a carrier material. Applying the mycomaterial to the fiber filters 120*a* to 120*n* can involve applying a coating of the mycomaterial to the fiber filters. In some cases, a water-resistant adhesive may be used to bind the mycomaterial to the fiber filters 120*a* to 120*n*. The carrier material can provide nutrients to the mycomaterial. The carrier material can be or include sugars such as maltose, glucose, fructose or sucrose, molasses, sorghum, mannitol, sorbitol, corn steep liquor, corn meal and soybean meal, vegetable oils, casein hydrolysate, grain brans, grape pumice, ammonium salts, amino acids, yeast extract, vitamins, etc. and combinations thereof. In some cases, the carrier material can be a biodegradable oil solution. The mycomaterial and carrier material can be combined and applied to the fiber filters 120*a* to 120*n*.

The filtering device 100 can be deployed in or near an oil rig or in a water pipeline.

In some embodiments, the fiber filters 120*a* to 120*n* can be used independently of the filtering device 100. For example, the fiber filters 120*a* to 120*n* can be used to form large net-like mats. The large mats can be used to line oil rigs or filter or contain ocean water contaminated with radioactive material, petroleum, or petroleum products. A ship or boat can pull the mats behind it, thereby filtering or containing the ocean water.

In some embodiments, the fiber filters 120*a* to 120*n* can be disposed in heating, ventilation, or air conditioning (HVAC) systems instead of the pipe 150. In such embodiments, the fiber filters can serve as air filters. The air filters can include graphene to aid in air filtration. Graphene is a two-dimensional mesh of carbon atoms in the form of a honeycomb lattice. The graphene can have a porous structure that allows forced air to pass through it but that adsorbs contaminants from the air. The graphene can be a biomass-derived graphene. The graphene can have about 100, 75, 50, 40, 30, 20, 10, or fewer layers. The graphene can have a thickness of about 300 nanometers (nm), 200 nm, 100 nm, 75 nm, 50 nm, 30 nm, 20 nm, or less. The graphene can be doped with iron, silicon, or aluminum. The porous graphene can provide a passage for convection of air but can have a large surface area that can effectively adsorb contaminants in the air.

In some embodiments, a device of the present disclosure may comprise a first opening and a second opening, and a fluid may flow in a direction away from the first opening and towards the second opening. The device may comprise a filtering unit (or a filtering segment) as disclosed herein to filter at least a portion of the fluid as the fluid is directed in a direction away from the first opening, through the filtering unit, and towards the second opening. The first opening can be in fluid communication with at least one valve (e.g., at least 1, 2, 3, 4, 5, or more valves) configured to control flow of the fluid into the first opening and towards the second opening (or towards the filtering unit disposed therebetween). The at least one valve can be a component of the first opening. Alternatively, the at least one valve can be a component of a channel (e.g., a pipe), which channel is coupled to the first opening. In some cases, the at least one valve can be configured to control a direction of flow of the fluid (e.g., allow the fluid to flow towards the first opening and towards the second opening, while inhibiting the fluid to flow in an opposite direction). In some cases, the at least one valve can be configured to control rate of flow of the fluid towards or through the first opening. Examples of a valve may include, but are not limited to, a check valve, a globe valve, a gate valve, a ball valve, a needle valve, a solenoid valve, and a spool valve.

In some embodiments, the filtering device of the present disclosure can be operatively coupled to (i) a storage unit or (ii) a processing unit of a hazardous or biohazardous material. In some embodiments, the filtering device of the present disclosure can be operatively coupled to (i) the storage unit or (ii) the processing unit of one or more members selected from the group comprising: petroleum, crude oil, diesel, jet fuel, gasoline, liquified petroleum gases (LPG), nuclear fuel. Examples of nuclear fuel include, but are not limited to, uranium oxide, uranium dioxide, mixed oxide (e.g., a blend of plutonium and uranium), uranium nitride, and uranium carbide. In some cases, the filtering device of the present disclosure can be operatively coupled to a housing of (i) the storage unit or (ii) the processing unit as disclosed herein. In some cases, the filtering device of the present disclosure can be operatively coupled to a protective casing of (i) the storage unit or (ii) the processing unit as disclosed herein. In some cases, the filtering device of the present disclosure can be operatively coupled to a filtering system of (i) the storage unit or (ii) the processing unit as disclosed herein. In some cases, the filtering device can comprise any fiber material as disclosed herein. The fiber material may be inoculated with a mycomaterial. Alternatively or in addition to, the fiber material may not be inoculated with a mycomaterial.

The system of the present disclosure can filter (e.g., remove) at least about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 30%, 40%, 50%, 60%, 70%, 80%, 90%, 95%, 99%, or more of the contaminants (e.g., debris, hazardous materials, biohazardous materials, etc.) from a given volume of the fluid. The system of the present disclosure can filter at most about 100%, 95%, 90%, 80%, 70%, 60%, 50%, 40%, 30%, 20%, 15%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, 0.1%, or less of the contaminants from a given volume of the fluid. The system of the present disclosure can filter at least about 0.1-fold, 0.2-fold, 0.3-fold, 0.4-fold, 0.5-fold, 0.6-fold, 0.7-fold, 0.8-fold, 0.9-fold, 1-fold, 2-fold, 3-fold, 4-fold, 5-fold, 6-fold, 7-fold, 8-fold, 9-fold, 10-fold, 15-fold, 20-fold, 30-fold, 40-fold, 50-fold, 60-fold, 70-fold, 80-fold, 90-fold, 100-fold, 200-fold, 300-fold, 400-fold, 500-fold, or more of the contaminants in the fluid as compared to a control filtering system without (i) the plurality of fibers or (ii) the mycomaterial. The system of the present disclosure can filter at least about 0.1-fold, 0.2-fold, 0.3-fold, 0.4-fold, 0.5-fold, 0.6-fold, 0.7-fold, 0.8-fold, 0.9-fold, 1-fold, 2-fold, 3-fold, 4-fold, 5-fold, 6-fold, 7-fold, 8-fold, 9-fold, 10-fold, 15-fold, 20-fold, 30-fold, 40-fold, 50-fold, 60-fold, 70-fold, 80-fold, 90-fold, 100-fold, 200-fold, 300-fold, 400-fold, 500-fold, or more of the contaminants in the fluid as compared to a control filtering system without (i) the plurality of fibers and (ii) the mycomaterial.

Figure 2:
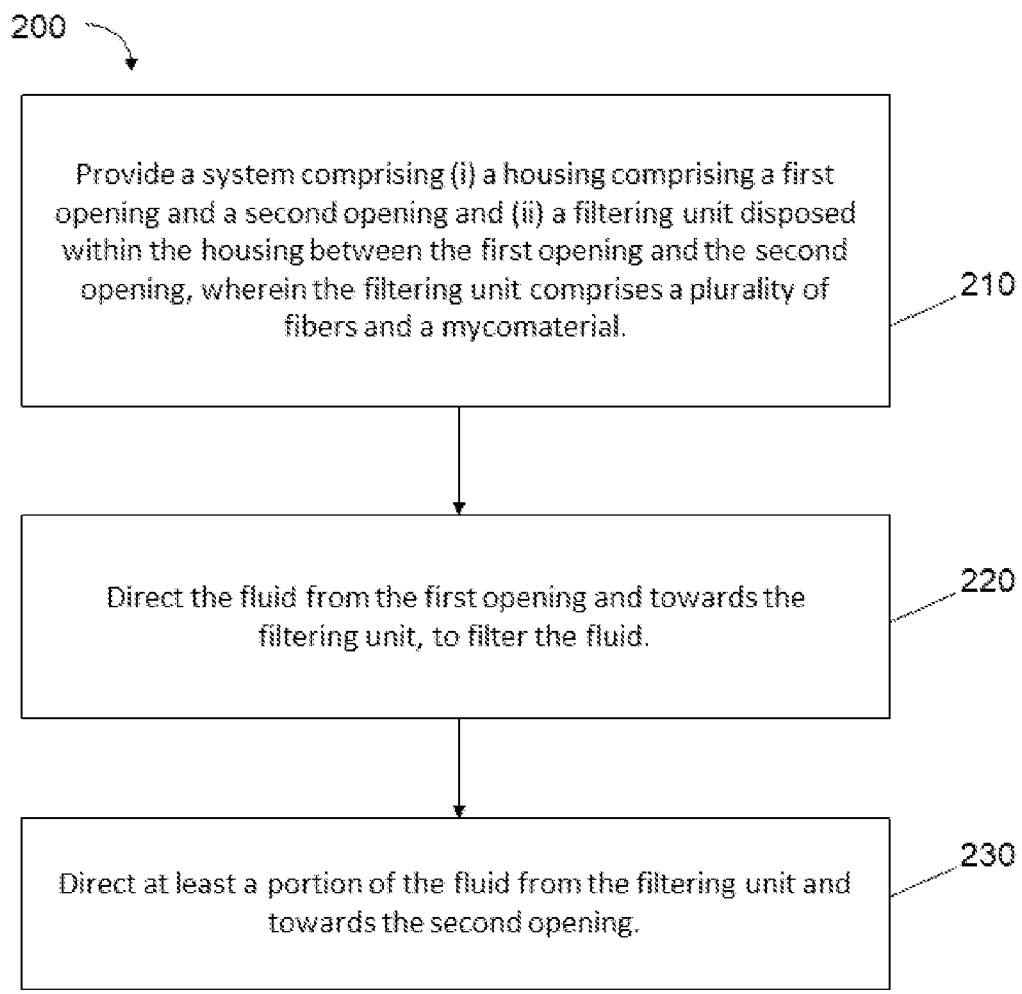
FIG. 2 illustrates an example flowchart of a method for filtering a fluid.

Another aspect of the present disclosure provides methods of filtering a fluid by using any of the systems (e.g., filtering devices) disclosed herein. For example, FIG. 2 illustrates an example flowchart of a method 200 for filtering a fluid. The method can comprise providing a system for filtering the fluid (process 210). The system can comprise (i) a housing comprising a first opening and a second opening and (ii) a filtering unit disposed within the housing between the first opening and the second opening. In some cases, the filtering unit can comprise a plurality of fibers and a mycomaterial. The plurality of fibers and the mycomaterial can be mixed (e.g., physically mixed). For example, the mycomaterial can be disposed on the surface of the plurality of fibers. Alternatively, the plurality of fibers and the mycomaterial can be compartmentalized such that they are not in physical contact. The method can further comprise directing the fluid from the first opening and towards the filtering unit, to filter the fluid (process 220). The method can further comprise directing at least a portion of the fluid from the filtering unit and towards the second opening (process 230).

While systems, methods, and devices in the present disclosure have used hemp material as example fiber material in the filtering devices, other fiber materials such as any bast fiber or hurd fiber, as described elsewhere herein, may be used, individually or in combination, in the filtering devices.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for filtering a fluid, comprising:
   a housing comprising a first opening and a second opening, wherein (i) said first opening is configured to receive said fluid and (ii) said second opening is configured to direct at least a portion of said fluid away from said housing;
   a filtering unit disposed within said housing between said first opening and said second opening, wherein said filtering unit is configured to filter said fluid to provide said at least said portion of said fluid, and wherein said filtering unit comprises (i) a plurality of fibers and (ii) a mycomaterial, and
   a carrier configured to provide nutrients to said mycomaterial;
   wherein said plurality of fibers comprises one or more members selected from the group consisting of (i) a plurality of layers of graphene, (ii) a plurality of hemp fibers, and (iii) live or recently harvested plant matter.

2. The system of claim 1, wherein said plurality of fibers are oriented substantially perpendicular to a direction of flow of said at least said portion of said fluid through said filtering unit.

3. The system of claim 1, wherein said plurality of fibers are oriented substantially perpendicular to a direction of flow of said at least said portion of said fluid from said first opening and towards said second opening.

4. The system of claim 1, wherein said first opening is configured to be in fluid communication with a first channel to receive said fluid from said first channel and towards said filtering unit.

5. The system of claim 1, wherein said second opening is configured to be in fluid communication with a second channel to direct said at least said portion of said fluid away from said filtering unit and towards said second channel.

6. The system of claim 1, wherein said plurality of fibers or said mycomaterial is configured to remove one or more contaminants from said fluid to provide said at least said portion of said fluid.

7. The system of claim 1, wherein a hemp fiber of said plurality of hemp fibers is carbonized.

8. The system of claim 1, wherein said mycomaterial comprises fungus or a derivative thereof.

9. The system of claim 8, wherein said fungus comprises yeasts, molds, or mushrooms.

10. The system of claim 8, wherein said derivative of said fungus comprises (i) fresh or dried fungal hyphae or (ii) fungal spores.

11. The system of claim 1, wherein said carrier comprises a sugar or a biodegradable oil.

12. The system of claim 1, wherein said fluid comprises an aqueous solution or petroleum.

13. The system of claim 1, wherein said housing is coupled to a pipe configured to direct flow of said fluid.

14. The system of claim 1, wherein said first opening is in fluid communication with a valve configured to direct flow of said fluid through said first opening and towards said filtering unit.

* * * * *